(12) United States Patent
Okita

(10) Patent No.: US 10,139,919 B2
(45) Date of Patent: Nov. 27, 2018

(54) ELECTRONIC DEVICE AND NUMERICAL CONTROLLER

(71) Applicant: FANUC CORPORATION, Yamanashi (JP)

(72) Inventor: Hiroshi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/687,987

(22) Filed: Aug. 28, 2017

(65) Prior Publication Data

US 2018/0067478 A1    Mar. 8, 2018

(30) Foreign Application Priority Data

Sep. 2, 2016 (JP) .................................. 2016-172096

(51) Int. Cl.
| | | |
|---|---|---|
| G06F 3/01 | (2006.01) | |
| G06F 3/0484 | (2013.01) | |
| G06F 3/0481 | (2013.01) | |
| G06F 3/0488 | (2013.01) | |
| G06F 9/451 | (2018.01) | |
| G05B 19/4093 | (2006.01) | |

(52) U.S. Cl.
CPC ....... *G06F 3/017* (2013.01); *G05B 19/40938* (2013.01); *G06F 3/0481* (2013.01); *G06F 3/0484* (2013.01); *G06F 3/0488* (2013.01); *G06F 3/04845* (2013.01); *G06F 3/04883* (2013.01); *G06F 9/451* (2018.02); *G05B 2219/34291* (2013.01); *G05B 2219/35312* (2013.01); *G05B 2219/35481* (2013.01)

(58) Field of Classification Search
CPC ...... G06F 3/017; G06F 3/0481; G06F 3/0484; G06F 3/04845; G06F 3/0488; G06F 3/04883; G06F 2203/04803; G06F 2203/04807; G06F 9/451

See application file for complete search history.

(56) References Cited

U.S. PATENT DOCUMENTS 6,862,712 B1    3/2005 Nakagawa et al.
9,116,696 B2 *  8/2015 Tokutake .............. G06F 1/3262
(Continued)

FOREIGN PATENT DOCUMENTS

JP    2000-259306    9/2000
JP    2001-296945    10/2001
(Continued)

*Primary Examiner* — Crystal J Barnes-Bullock
(74) *Attorney, Agent, or Firm* — Wenderoth, Lind & Ponack, L.L.P.

(57) ABSTRACT

To provide an electronic device and numerical controller that can achieve reduction in work for changing a display state after start-up of an application. A numerical controller comprises: a display control unit that displays one started application or multiple started applications simultaneously on the display unit; an input unit that accepts input through the operation unit and identifies a position on the display unit; a recognition unit that recognizes a figure drawn with the operation unit based on the identified position; and a start-up unit that starts an application associated with the figure and determines an initial display position for the started application based on the position on the display unit where the figure is drawn.

5 Claims, 9 Drawing Sheets

(56) References Cited

U.S. PATENT DOCUMENTS

| | | | | |
|---|---|---|---|---|
| 9,495,061 B2* | 11/2016 | Fujiwaka | ............... | G06F 1/1643 |
| 2013/0042196 A1* | 2/2013 | Yamanaka | ............ | G06F 3/0484 |
| | | | | 715/772 |
| 2015/0234551 A1* | 8/2015 | Yoshida | ................ | G06F 3/0482 |
| | | | | 715/768 |
| 2016/0011775 A1* | 1/2016 | Guo | .................... | G06F 3/04817 |
| | | | | 715/765 |
| 2017/0212667 A1* | 7/2017 | Miyazaki | ............ | G06F 3/04883 |

FOREIGN PATENT DOCUMENTS

| | | |
|---|---|---|
| JP | 2001-325054 | 11/2001 |
| JP | 2003-178259 | 6/2003 |
| JP | 2008-53884 | 3/2008 |
| JP | 2010-55177 | 3/2010 |
| JP | 2013-97643 | 5/2013 |
| JP | 2014-164718 | 9/2014 |
| WO | 2015/025382 | 2/2015 |

* cited by examiner

FIG. 8
START-UP METHOD(a)
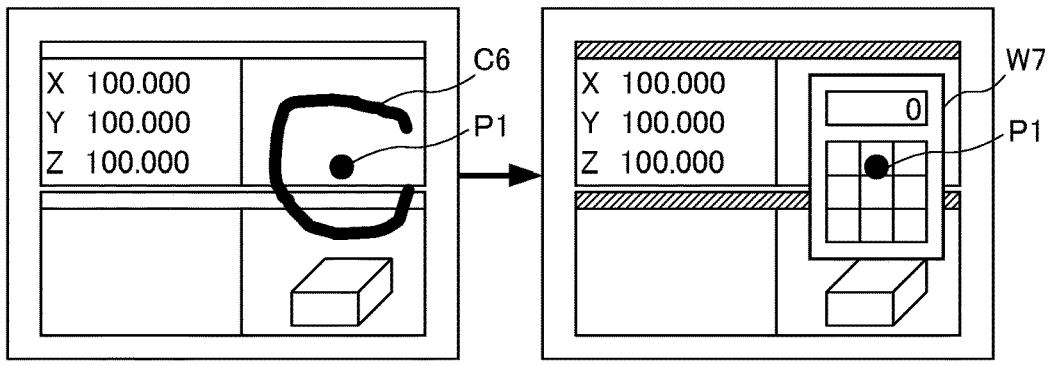
START-UP METHOD(b)
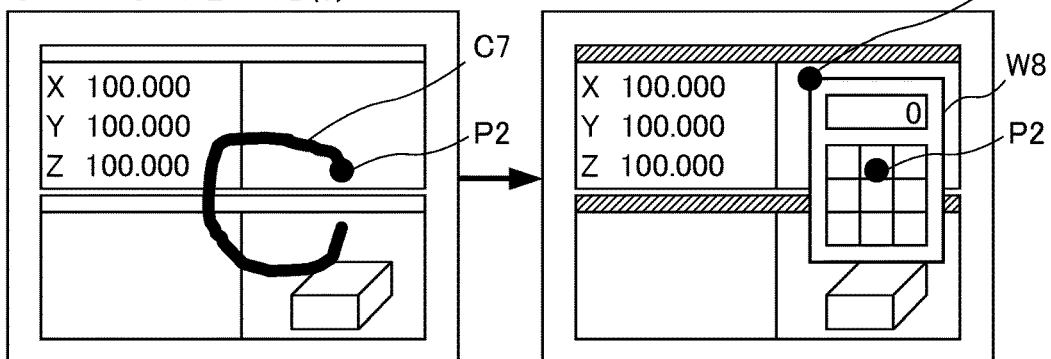
START-UP METHOD(c)
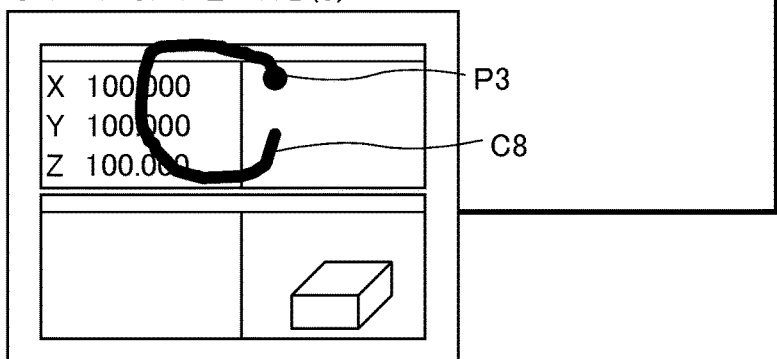
START-UP METHOD(d)
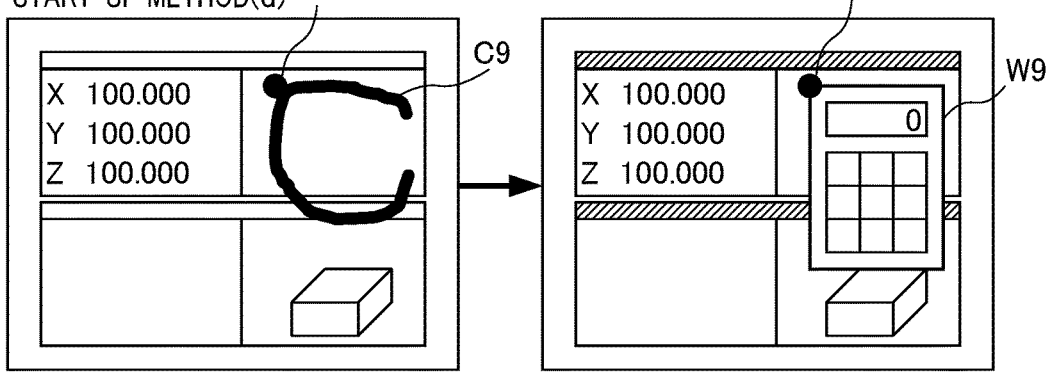

FIG. 9
START-UP METHOD(a)
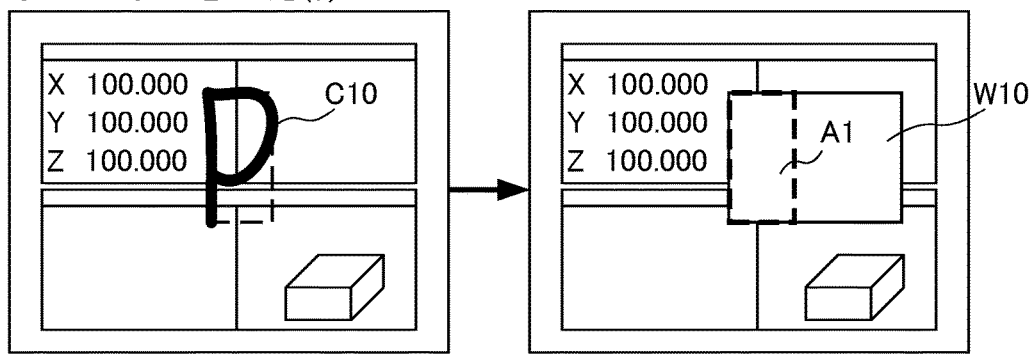
START-UP METHOD(b)
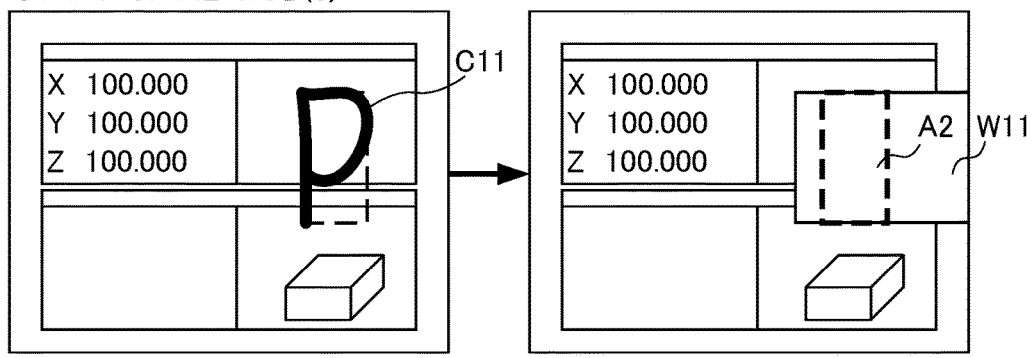

ELECTRONIC DEVICE AND NUMERICAL CONTROLLER

This application is based on and claims the benefit of priority from Japanese Patent Application No. 2016-172096, filed on 2 Sep. 2016, the content of which is incorporated herein by reference.

BACKGROUND OF THE INVENTION

Field of the Invention

The present invention relates to an electronic device and numerical controller for display of an application screen.

Related Art

A conventional numerical controller (CNC device) for controlling a machine tool includes an application for machining control and additionally, various applications such as a memo pad, a calculator, and a document viewer incorporated in consideration of convenience. These applications are started in response to an operator's instruction. A common method of starting an application is to select an icon placed on a home screen, for example. There has also been a known start-up method using what is called a stroke command. According to this method, a figure such as a character or a symbol is drawn on a screen to instruct start-up of an associated application (see Patent Document 1, for example).

Patent Document 1: Japanese Unexamined Patent Application, Publication No. 2010-055177

SUMMARY OF THE INVENTION

However, the conventional start-up method using an icon or a stroke command has merely been to select an application to be started. Specifically, the position and the size of a window for an application to be displayed have been determined automatically irrespective of a situation in which a user is placed to prohibit designation by the user. For example, the position and the size of such a window have been returned to their preset states or to their states at the time when the application was finished last time. This has necessitated the user to change the position and the size of the window after start-up of the application, particularly if there are multiple windows and the user intends to perform an operation while checking a screen already started behind the application window.

The present invention is intended to provide an electronic device and numerical controller that can achieve reduction in work for changing a display state after start-up of an application.

(1) An electronic device (numerical controller 1 described later, for example) according to the present invention comprises: a display control unit (display control unit 114 described later, for example) that displays one started application or multiple started applications simultaneously on a display unit (display/MDI unit 70 described later, for example); an input unit (input unit 111 described later, for example) that accepts input through an operation unit (display/MDI unit 70 described later, for example) and identifies a position on the display unit; a recognition unit (recognition unit 112 described later, for example) that recognizes a figure drawn with the operation unit based on the identified position; and a start-up unit (start-up unit 113 described later, for example) that starts an application associated with the figure and determines an initial display position for the started application based on the position on the display unit where the figure is drawn.

(2) In the electronic device according to (1), the start-up unit may determine an initial display size for the application based on the size of the figure.

(3) In the electronic device according to (2), if the application is to be displayed at a fixed aspect ratio, the start-up unit may determine the initial display size based on either a vertical length or a horizontal length of the figure.

(4) In the electronic device according to any one of (1) to (3), if the initial display position goes out of a range of the display unit, the start-up unit may move the initial display position so as to allow the application to be displayed entirely.

(5) A numerical controller (numerical controller 1 described later, for example) according to the present invention is for controlling a machine tool. The numerical controller is connected to a display unit (display/MDI unit 70 described later, for example) and an operation unit (display/MDI unit 70 described later, for example). The numerical controller comprises: a display control unit (display control unit 114 described later, for example) that displays one started application or multiple started applications simultaneously on the display unit; an input unit (input unit 111 described later, for example) that accepts input through the operation unit and identifies a position on the display unit; a recognition unit (recognition unit 112 described later, for example) that recognizes a figure drawn with the operation unit based on the identified position; and a start-up unit (start-up unit 113 described later, for example) that starts an application associated with the figure and determines an initial display position for the started application based on the position on the display unit where the figure is drawn.

According to the present invention, work for changing a display state is reduced after start-up of an application.

BRIEF DESCRIPTION OF THE DRAWINGS

FIG. 8 shows exemplary variations of a reference point according to the second application start-up method;

FIG. 9 shows an example of a third application start-up method; and

DETAILED DESCRIPTION OF THE INVENTION

An example of an embodiment of the present invention will be described below. A numerical controller 1 (electronic device) according to this embodiment controls a servo motor, etc. provided in a machine tool by following a set parameter and a set program.

Figure 1:
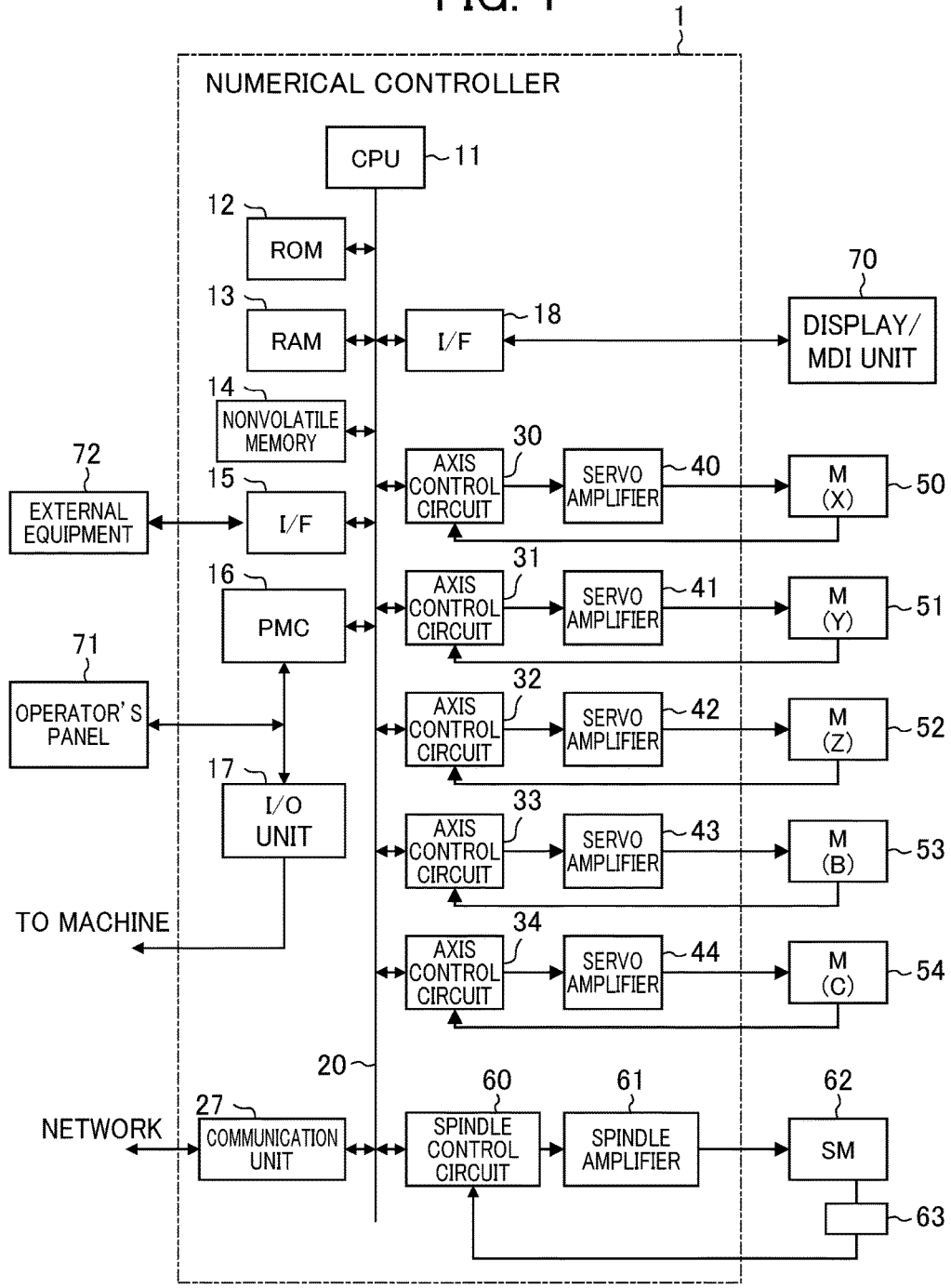
FIG. 1 is a block diagram showing the hardware configuration of a principal part of a numerical controller.

FIG. 1 is a block diagram showing the hardware configuration of a principal part of the numerical controller 1. The numerical controller 1 includes a CPU 11 as a processor that controls the entire numerical controller 1. The CPU 11 reads a system program stored in a ROM 12 through a bus 20 and controls the entire numerical controller 1 by following the read system program. A RAM 13 stores temporary calculated data, display data, and various types of data input by an operator through a display/MDI unit 70. Generally, access is made faster to a RAM than to a ROM. Thus, the CPU 11 may deploy the system program stored in the ROM 12 in advance on the RAM 13. Then, the CPU 11 may read the system program from the RAM 13 and execute the read system program. A nonvolatile memory 14 is a magnetic storage unit, a flash memory, an MRAM, FRAM, or an EEPROM, for example. Alternatively, the nonvolatile memory 14 is an SRAM or a DRAM backed up by a battery, for example. The nonvolatile memory 14 is configured as a nonvolatile memory to hold its storage state even after the numerical controller 1 is powered off. The nonvolatile memory 14 stores a machining program, etc. input through an interface 15, the display/MDI unit 70, or a communication unit 27.

The ROM 12 stores various system programs written in advance for executing processing in an edit mode required for generation and editing of a machining program and for executing processing for automatic operation. Various machining programs are input through the interface 15, the display/MDI unit 70, or the communication unit 27, and are stored into the nonvolatile memory 14. The interface 15 connects between the numerical controller 1 and external equipment 72. A machining program, various parameters, etc., are read from the external equipment 72 into the numerical controller 1. The machining program edited in the numerical controller 1 can be stored into an external storage through the external equipment 72. Specific examples of the interface 15 include an RS232C interface, a USB, an SATA interface, a PC card slot, a CF card slot, an SD card slot, Ethernet, and Wi-Fi. The interface 15 can be located on the display/MDI unit 70. Examples of the external equipment 72 include a computer, a USB memory, a CFast card, a CF card, and an SD card.

A programmable machine controller (PMC) 16 outputs a signal through an I/O unit 17 to an auxiliary device (such as an automatic tool change device) of a machine tool to control the auxiliary device by following a sequence program provided in the numerical controller 1. The PMC 16 accepts signals input through various switches, etc. of an operator's panel 71 arranged at the body of the machine tool, executes necessary signal processing, and transfers the processed signals to the CPU 11. Generally, the PMC 16 is also called a programmable logic controller (PLC). The operator's panel 71 is connected to the PMC 16. The operator's panel 71 may include a manual pulse generator, for example. The display/MDI unit 70 is a manual data input unit with a display (display unit) and an operation unit such as a keyboard or a touch panel. An interface 18 is used for transmitting screen data to be displayed to the display of the display/MDI unit 70. The interface 18 is also used for receiving a command and data from the operation unit of the display/MDI unit 70 and transferring the received command and data to the CPU 11.

Axis control circuits 30 to 34 of corresponding axes receive movement command amounts of the corresponding axes given from the CPU 11, and output the commands on the corresponding axes to servo amplifiers 40 to 44 respectively. In response to receipt of these commands, the servo amplifiers 40 to 44 drive servo motors 50 to 54 of the corresponding axes respectively. The servo motors 50 to 54 of the corresponding axes each include a built-in position and speed detector. The servo motors 50 to 54 transmit position and speed feedback signals as feedbacks to the axis control circuits 30 to 34 respectively, thereby exerting position and speed feedback control.

A spindle control circuit 60 outputs a spindle speed signal to a spindle amplifier 61 in response to receipt of a spindle rotation command directed to the machine tool. In response to receipt of the spindle speed signal, the spindle amplifier 61 rotates a spindle motor 62 of the machine tool at a rotation speed designated by the command, thereby driving a tool. A pulse encoder 63 is coupled to the spindle motor 62 with a gear or a belt, for example. The pulse encoder 63 outputs a feedback pulse in synchronization with the rotation of a spindle. The feedback pulse passes through the bus 20 to be read by the CPU 11.

Figure 2:
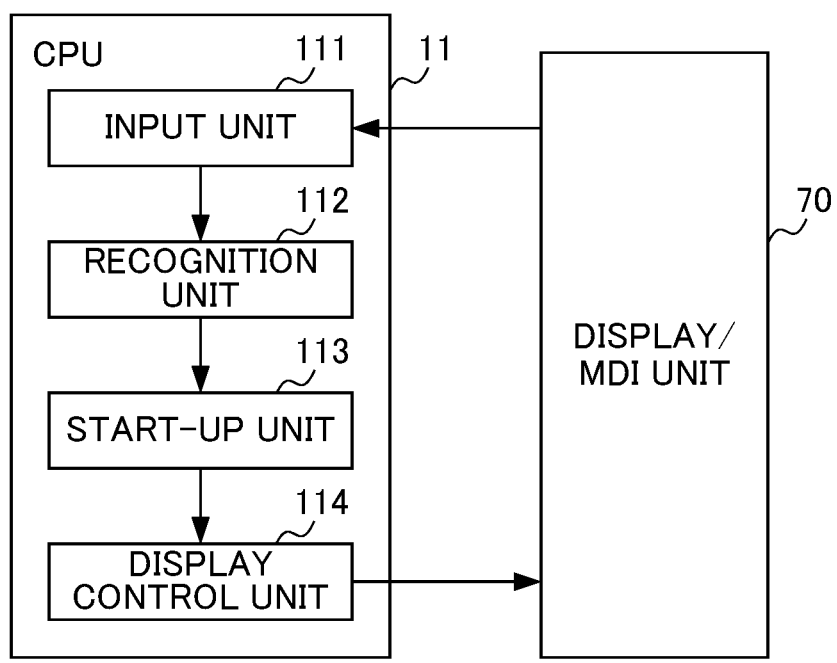
FIG. 2 is a block diagram showing the functional configuration of a CPU.

FIG. 2 is a block diagram showing the functional configuration of the CPU 11 of the numerical controller 1. The CPU 11 includes an input unit 111, a recognition unit 112, a start-up unit 113, and a display control unit 114. Each of these functional units is realized by execution of the system program stored in the ROM 12 by the CPU 11.

The input unit 111 accepts operation input from an operator given through the operation unit of the display/MDI unit 70 and identifies a position on the display unit designated by the operator. More specifically, the input unit 111 acquires a path of a pointer dragged by the operator on the touch panel or with a mouse as coordinates, for example.

The recognition unit 112 recognizes a figure drawn with the operation unit, specifically, a stroke command based on the path of the position identified by the input unit 111. More specifically, the recognition unit 112 checks the input figure against information about a stroke command stored in advance for each application in the ROM 12. If the recognition unit 112 determines that the input stroke command is registered with the ROM 12, the recognition unit 112 notifies the start-up unit 113 of an application associated with the stroke command.

The start-up unit 113 starts the application notified from the recognition unit 112. Further, the start-up unit 113 determines an initial display position for the started application based on the position on the display unit where the stroke command is drawn. Further, the start-up unit 113 determines an initial display size for the application based on the size of the stroke command.

The display control unit 114 displays one started application or multiple started applications simultaneously on the display unit. While the display control unit 114 allows overlap between windows for the multiple applications, the display control unit 114 controls display of each application. The display control unit 114 displays an application newly started by the start-up unit 113 in front of applications already started.

An application start-up method implemented by the numerical controller 1 will be described by giving exemplary patterns according to types of applications (1) to (3):
(1) An application for which a display size can be changed;
(2) An application for which a display size is fixed and cannot be changed; and
(3) An application for which a window shape (aspect ratio) is fixed.

Figure 3:
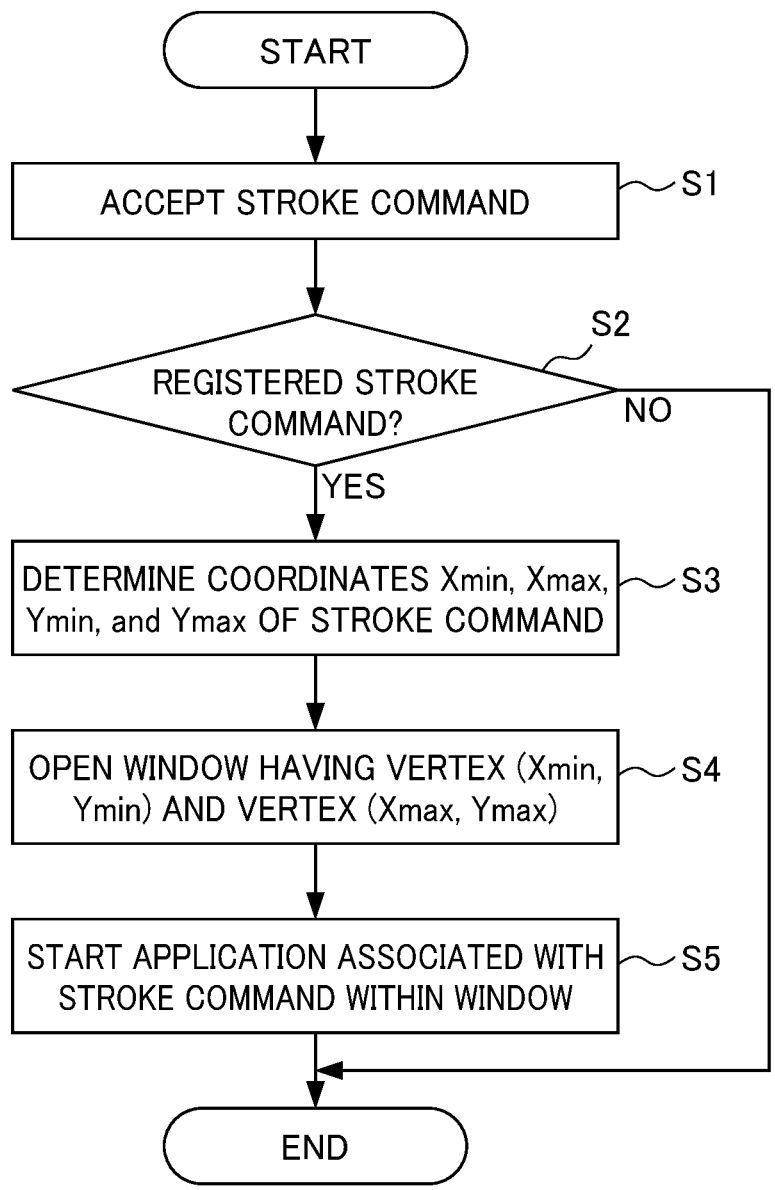
FIG. 3 is a flowchart showing a first application start-up method.

FIG. 3 is a flowchart showing a first application start-up method implemented by the numerical controller 1. The first application start-up method is applicable to an application for which a display size (a vertical length and a horizontal length) can be changed.

In step S1, the input unit 111 accepts input of a stroke command from the operation unit of the display/MDI unit 70. In step S2, the recognition unit 112 determines whether or not the accepted stroke command is already registered. If YES, the processing shifts to step S3. If NO, the processing is finished. The recognition unit 112 may output an error indicating input of an unregistered command.

In step S3, the start-up unit 113 determines a minimum (Xmin) and a maximum (Xmax) on a horizontal axis, and a minimum (Ymin) and a maximum (Ymax) on a vertical axis from coordinates of the input stroke command on the display unit. In step S4, the start-up unit 113 opens a window having a vertex (Xmin, Ymin) and a vertex (Xmax, Ymax). In step S5, the start-up unit 113 starts an application associated with the stroke command within the window.

Figure 4:
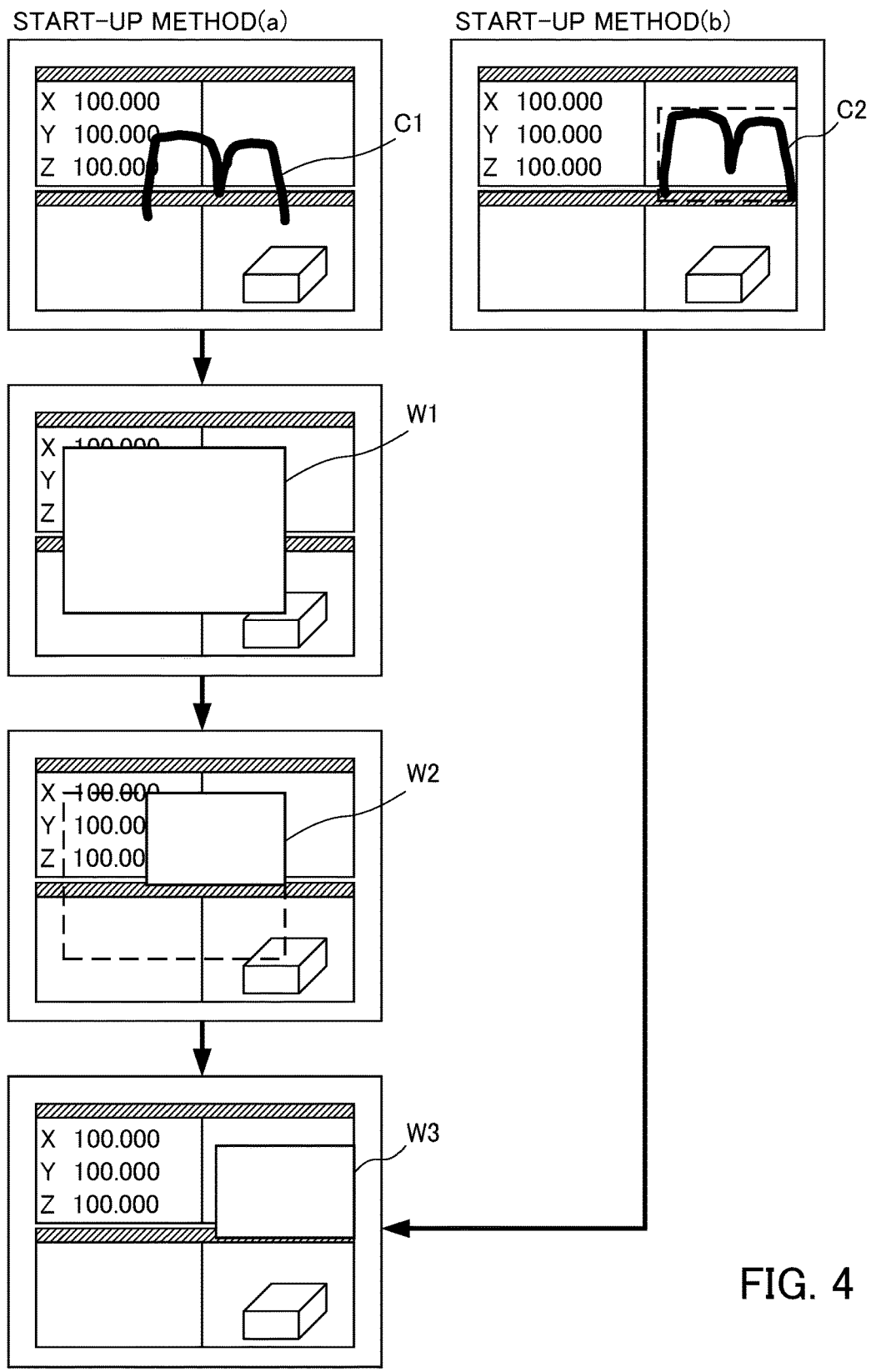
FIG. 4 shows an example of a screen displayed by the first application start-up method.

FIG. 4 shows an example of a screen displayed by the first application start-up method. In this example, while an application for machining control has already been started, a different application (a memo pad, for example) is being started in response to a stroke command (a character "M," for example).

According to a conventional start-up method (a), in response to a stroke command C1, the application is started within a window W1 of a preset size at a preset position. After the application is started, an operator changes the window W1 to a size (a window W2), and moves the window W2 to a position (a window W3) that allows display contents of the application on the back to be recognized visually. In contrast, according to the first application start-up method (b) of this embodiment, the operator inputs a stroke command C2 of a desired size to a position where the application is desired to be started. Then, the numerical controller 1 starts the application within the window W3 conforming to a vertical length and a horizontal length of the stroke command C2.

Figure 5:
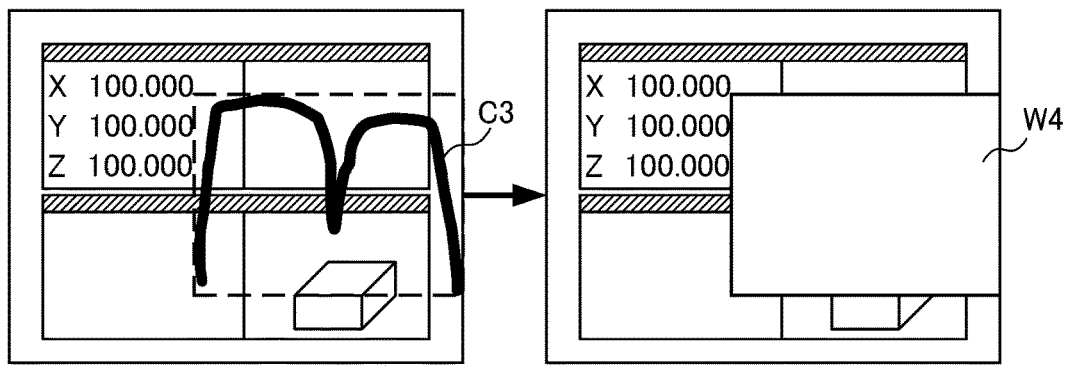
FIG. 5 shows exemplary variations of a display size according to the first application start-up method.

FIG. 5 shows exemplary variations of a display size according to the first application start-up method. Like in the case of a start-up method (a) of FIG. 5, in response to a stroke command C3 drawn to be larger than the command in the case of the start-up method (b) of FIG. 4, a window W4 for the application is enlarged. Like in the case of a start-up method (b) of FIG. 5, in response to a stroke command C4 drawn to have a different aspect ratio, the application is started within a window W5 having the same aspect ratio and having the same size as the stroke command C4.

Figure 6:
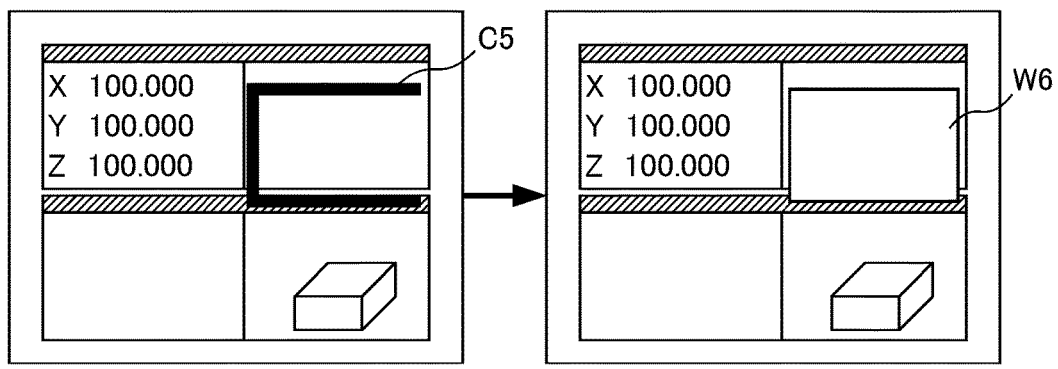
FIG. 6 shows an example of the shape of a stroke command according to the first application start-up method.

FIG. 6 shows an example of the shape of a stroke command according to the first application start-up method. A figure used as a stroke command is not limited to a character such as that shown in FIG. 5. In consideration of ease of drawing by an operator, for example, a figure to be registered as a stroke command may be one that facilitates an intuitive grasp of sides or vertices of a window for an application to be started. In this case, a stroke command C5 and a window W6 for an application to be started can easily be associated with each other in terms of a position and a shape.

Figure 7:
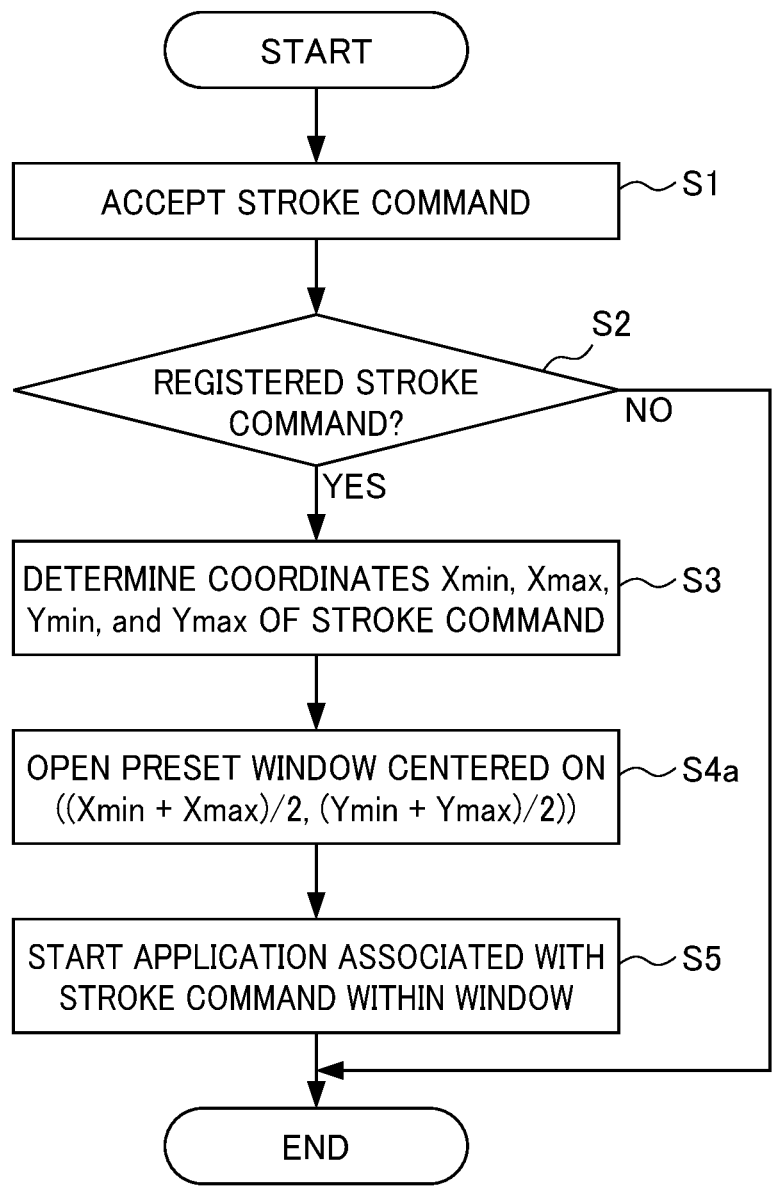
FIG. 7 is a flowchart showing a second application start-up method.

FIG. 7 is a flowchart showing a second application start-up method implemented by the numerical controller 1. The second application start-up method is applicable to an application for which a display size is fixed and cannot be changed.

In step S1, the input unit 111 accepts input of a stroke command from the operation unit of the display/MDI unit 70. In step S2, the recognition unit 112 determines whether or not the accepted stroke command is already registered. If YES, the processing shifts to step S3. If NO, the processing is finished. The recognition unit 112 may output an error indicating input of an unregistered command.

In step S3, the start-up unit 113 determines a minimum (Xmin) and a maximum (Xmax) on a horizontal axis, and a minimum (Ymin) and a maximum (Ymax) on a vertical axis from coordinates of the input stroke command on the display unit. In step S4a, the start-up unit 113 opens a window of a preset size centered on ((Xmin+Ymin)/2, (Xmax+Ymax)/2). In step S5, the start-up unit 113 starts an application associated with the stroke command within the window.

In the example described by referring to this flowchart, the center of a stroke command is defined as a reference point and a display position centered on this reference point is determined for a window. However, this is not the only method of setting a reference point. If appropriate, a reference point can be set by a different method.

FIG. 8 shows exemplary variations of a reference point according to the second application start-up method. According to a start-up method (a), a center point P1 in a drawing area of a stroke command C6 is defined as a reference point and a window W7 centered on this reference point is displayed. According to a start-up method (b), a start point P2 of drawing of a stroke command C7 is defined as a reference point and a window W8 centered on this reference point is displayed. According to a start-up method (c), a start point P3 of drawing of the stroke command C7 is defined as a reference point and the window W8 having this reference point at a vertex is displayed. According to a start-up method (d), a vertex P4 of a drawing area of a stroke command C9 is defined as a reference point and a window W9 having this reference point at a vertex is displayed.

FIG. 9 shows an example of a third application start-up method implemented by the numerical controller 1. The third application start-up method is applicable to an application for which a window shape (aspect ratio) is fixed such as a viewer for photographs or manuals, for example.

The start-up unit 113 determines an initial display size for an application based on either a vertical length or a horizontal length of an area of a drawn stroke command. Referring to a start-up method (a) of FIG. 9, for example, an application is started within a window W10 of a shape (aspect ratio) preset based on a vertical length of an area A1 designated by a stroke command C10. In this example, a display position is determined so as to achieve conformity between a side on the left of the area A1 and that of the window W10. However, this is not the only way of determining a display position. A display position may be determined so as to achieve conformity between the center of the area A1 and that of the window W10 or between a side on the right of the area A1 and that of the window W10.

If an initial display position for a window goes out of a range of the display unit, the start-up unit 113 moves a display position so as to allow the entire window to be displayed. Like in the case of a start-up method (b) of FIG. 9, if a window for an application is opened so as to achieve conformity between a side on the left of the window and that of an area A2 designated by a stroke command C11, for example, the window unfortunately goes out of the range of the display unit. Thus, the start-up unit 113 moves a window W11 toward the center of the display unit to allow the entire window W11 to be displayed.

Figure 10:
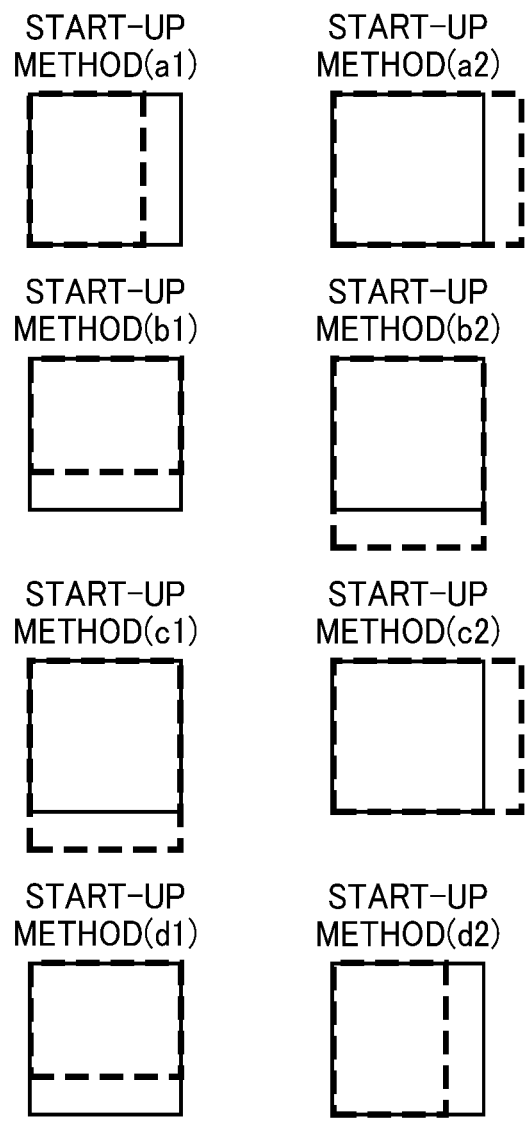
FIG. 10 shows exemplary variations of a method of determining a display position and a display size according to the third application start-up method.

FIG. 10 shows exemplary variations of a method of determining a display position and a display size according to the third application start-up method. According to a startup method (a1) and a startup method (a2), a window (solid lines) is displayed based on a vertical length of an area (dashed lines) designated by a stroke command so as to achieve conformity between a side on the left of the area and that of the window. According to a startup method (b1) and a startup method (b2), a window (solid lines) is displayed based on a horizontal length of an area (dashed lines) designated by a stroke command so as to achieve conformity between a side on the top of the area and that of the window. According to a start-up method (c1) and a start-up method (c2), a window (solid lines) of a maximum size for falling within an area (dashed lines) designated by a stroke command is displayed so as to achieve conformity between a vertical length of the area and that of the window or between a horizontal length of the area and that of the window. According to a start-up method (d1) and a start-up method (d2), a window (solid lines) of a minimum size for covering an area (dashed lines) designated by a stroke command inside the window is displayed so as to achieve conformity between a vertical length of the area and that of the window or between a horizontal length of the area and that of the window.

According to this embodiment, the numerical controller 1 determines an initial display position for an application based on a position where a stroke command is drawn. Thus, when one application is started while a different application is already displayed, the numerical controller 1 allows display of the started application at a position desired by an operator only through input of a stroke command. As a result, work for moving the application to a position where the application is easily viewable from the operator is reduced after start-up of the application.

Further, the numerical controller 1 determines a display size for an application to be started in such a manner that the display size conforms to the size of a drawn stroke command. This allows display of the application of a size desired by an operator only through input of a stroke command. As a result, work for changing the application to a size that makes the application easily viewable from the operator is reduced after start-up of the application.

The numerical controller 1 can determine a display position and a display size appropriately even for an application for which an aspect ratio is fixed based on either a vertical length or a horizontal length of a stroke command. In this case, the numerical controller 1 adjusts an initial display position in such a manner that a window for the application falls within the range of the display unit. This reduces work for moving the application to be done by an operator to enhance convenience.

Although an embodiment of the present invention has been described, the present invention is not to be limited to the above-described embodiment. The effects described in this embodiment are merely a list of most preferred effects resulting from the present invention. Effects achieved by the present invention are not to be limited to those described in this embodiment.

According to the above-described first or third application start-up method, the start-up unit 113 determines a display size for a window in such a manner that the display size has a length same as a vertical length and a horizontal length, or either the vertical length or the horizontal length of a rectangular area where a stroke command is drawn. However, this is not the only way of determining a display size. A display size may be determined by adding a length corresponding to a frame width of a window to be displayed, for example. As another example, in consideration of wobbling occurring during drawing by an operator, a display size may be determined by subtracting a given length. These calculation methods can be set appropriately.

Regarding the second application start-up method, a reference point can be set appropriately at a position such as the center of an area where a stroke command is drawn, each vertex of the area, a start point of drawing, or an end point of the drawing, for example, as long as coordinates can be identified at such positions. Likewise, a position of a window for an application to be associated with this reference point can be set appropriately. For example, the reference point can be associated with the center or a vertex of the window. The numerical controller 1 may accept and store such a condition for determining a display position for each application.

The application start-up method implemented by the numerical controller 1 is realized by software. To realize the application start-up method by software, programs constituting the software are installed on a computer (numerical controller 1). These programs may be stored in a removable medium and then distributed to a user. Alternatively, these programs may be distributed by being downloaded onto a computer of the user through a network.

In this embodiment, the numerical controller 1 is described as an example of the electronic device. However, the numerical controller 1 is not the only example of the electronic device. The present invention is applicable to various types of information processors (computers) capable of executing multiple applications in multiple windows such as servers, PCs, mobile terminals, game machines, home appliances, and navigation systems, for example.

EXPLANATION OF REFERENCE NUMERALS

1 Numerical controller (electronic device)
11 CPU
70 Display/MDI unit (display unit, operation unit)
111 Input unit
112 Recognition unit
113 Start-up unit
114 Display control unit

What is claimed is:

1. An electronic device comprising:
a display control unit that displays one started application or multiple started applications simultaneously on a display unit;
an input unit that accepts input through an operation unit and identifies a position on the display unit;
a recognition unit that recognizes a figure drawn with the operation unit based on the identified position; and
a start-up unit that starts an application associated with the figure and determines an initial display position for the started application based on the position on the display unit where the figure is drawn.

2. The electronic device according to claim 1, wherein the start-up unit determines an initial display size for the application based on the size of the figure.

3. The electronic device according to claim 2, wherein if the application is to be displayed at a fixed aspect ratio, the start-up unit determines the initial display size based on either a vertical length or a horizontal length of the figure.

4. The electronic device according to claim 1, wherein if the initial display position goes out of a range of the display unit, the start-up unit moves the initial display position so as to allow the application to be displayed in its entirety.

5. A numerical controller for controlling a machine tool, the numerical controller being connected to a display unit and an operation unit, the numerical controller comprising:

a display control unit that displays one started application or multiple started applications simultaneously on the display unit;
an input unit that accepts input through the operation unit and identifies a position on the display unit;
a recognition unit that recognizes a figure drawn with the operation unit based on the identified position; and
a start-up unit that starts an application associated with the figure and determines an initial display position for the started application based on the position on the display unit where the figure is drawn.

* * * * *